United States Patent [19]

Rath

[11] Patent Number: 4,806,054
[45] Date of Patent: Feb. 21, 1989

[54] MALE THREADED FASTENER CAPABLE OF USE WITH A SWAGED COLLAR

[76] Inventor: Jack Rath, 9823 Kincardine Ave., Los Angeles, Calif. 90034

[21] Appl. No.: 204,939

[22] Filed: May 31, 1988

Related U.S. Application Data

[63] Continuation of Ser. No. 846,299, Mar. 31, 1986, abandoned.

[51] Int. Cl.⁴ .................................................. F16B 39/02
[52] U.S. Cl. .................................... 411/361; 411/336; 411/417; 411/938
[58] Field of Search .............. 411/361, 360, 310, 311, 411/315–317, 319, 333–336, 277, 281–284, 411, 417–421, 925, 938; 10/10 R, 27 R

[56] References Cited

U.S. PATENT DOCUMENTS

| | | | |
|---|---|---|---|
| 313,552 | 3/1885 | Sweet | 411/418 X |
| 612,370 | 10/1898 | Wall | 411/333 X |
| 784,014 | 2/1905 | Steel | 411/334 X |
| 2,177,004 | 10/1939 | Purtell | 411/311 |
| 2,301,181 | 11/1942 | Ilsemann | 411/938 X |
| 2,543,100 | 2/1951 | Engh | 411/411 X |
| 3,421,562 | 1/1969 | Orloff et al. | |
| 3,517,717 | 6/1970 | Orlomoski | 411/938 X |
| 3,850,215 | 11/1974 | Orlomoski | 411/938 X |
| 3,882,917 | 5/1975 | Orlomoski | 411/938 X |
| 3,927,503 | 12/1975 | Wilson | 411/311 |
| 4,252,168 | 2/1981 | Capuano | 411/311 |

Primary Examiner—Lloyd A. Gall
Attorney, Agent, or Firm—Christie, Parker & Hale

[57] ABSTRACT

A male threaded fastener has a plurality of impressions on the nonload-bearing flank of the thread that receives material swaged from a collar to lock the collar and pin together and increase the breakaway torque of the collar. The impressions have a depth of about 0.1 to about 0.3 of the depth of the thread from root to crest. The thread is free of impressions at least 1.5 pitch lengths from its ends.

4 Claims, 1 Drawing Sheet

MALE THREADED FASTENER CAPABLE OF USE WITH A SWAGED COLLAR

CROSS-REFERENCE TO RELATED APPLICATIONS

This is a continuation of application Ser. No. 846,299, filed Mar. 31, 1986, now abandoned.

BACKGROUND OF THE INVENTION

The present invention relates to threaded bolts and pins capable of receiving a swaged collar and having impressions in the threads to receive swaged collar material and improve the breakaway torque of the collar from the bolts and pin.

For purposes of nomenclature, threaded male fasteners include threaded pins, bolts, and studs. Pins and bolts have heads that bear on one side of the workpieces, a shank that extends through the workpieces, and threads extending out the other side of the workpieces; studs have threads at both ends. Threaded female fasteners include nuts and collars that have threads that engage the threads of male fasteners and cooperate with the male fasteners in clamping-up workpieces. This specification will generally use "pin" to encompass studs, pins and bolts, and "collar" to encompass both collars and nuts. A thread has a load-bearing flank and a nonload-bearing flank. The load-bearing flank does the work of the thread by loading the corresponding load-bearing flank of the cooperating threaded element. Swagable collars are collars that are plastically deformed into grooves of a male fastener element to make a joint. Preload is the clamp-up force applied to the workpieces by the fasteners, which in turn is applied to the pins by the workpeces.

Threaded pins have been used with swagable collars instead of threaded collars. When used with swagable collars, swaged collar material enters the groove of the male thread and locks the collar and the pin together during the forming of a joint of these two components and two or more workpieces. The use of a threaded pin with a swagable collar increases the flexibility of the pin: it can be used with a swagable collar or a threaded collar.

Threaded pins used with swagable collars differ from lock bolts. Lock bolts have one or more annular grooves that receive swaged material from a collar. These annular grooves are not connected; therefore, even if the collar rotates, it cannot separate from the lock bolt, and the workpieces still experience compressive load from the fastener component. But a lock bolt cannot be used with a threaded collar.

Recognizing the collars swaged onto threaded pins can loosen, some have provided impressions in the thread of a pin to create interference between the two.

An example of these efforts is U.S. Pat. No. 3,421,562 to Orloff et al. The patentees show knurlings in the thread of a pin adjacent the interior end of the thread, the end closest to the head of the pins and next to the pin shank. These knurlings interrupt the crest of the thread and extend to both the load-bearing and nonload-bearing flanks of the thread. Orloff et al. does not extend the knurlings past the zone of the thread that in service occupies the position adjacent one side of the workpieces joined by the pin and a swaged collar. The reason for this, presumably, is that the patentees use a hybrid collar that threads onto the pin, and after applying a clamp-up load to the workpieces the collar is swaged onto the threads in a zone adjacent the workpieces.

National Aerospace Standard 4444 published in 1974 also shows knurls in threads of a threaded pin. These knurls occur at least from the interior end of the thread for several pitch lengths, and can occur all along the length of the thread. The knurls breach the thread crest from the load-bearing to the nonload-bearing flanks.

While effective in increasing breakaway torque between a swaged collar and a threaded pin, the knurls produce substantial friction between the load-bearing flank of the pin and the load-bearing flank of a threaded collar. This friction increases the setting torque required to set the fastener, and when setting torque measures preload reduces the preload on the workpieces. Known preload on workpieces must be reliably applied so that the fatigue life of joints is known and acceptable. Increased frictional loads from the knurls in the thread can reduce preload on the workpieces and reduce fatigue life below acceptable levels.

SUMMARY OF THE INVENTION

The present invention provides a threaded male fastener with impressions or recesses on the nonload-bearing flank of the thread that increase the breakaway torque of a collar swaged over the thread but which in use with a threaded nut do not increase the friction between the nut thread and the pin.

In one particular form, the present invention contemplates a threaded pin having the impressions spaced at regular intervals on the crest of the thread of the pin only on the nonload-bearing flank of the pin thread; the impressions do not breach the crest and do not extend through the load-bearing flank of the thread. These impressions have a depth of about 0.1 to about 0.3 of the height of the thread measured from thread root to thread crest. The thread is free of impressions within about 1.5 pitch length of the interior and exterior ends of the thread.

The impressions on the nonload-bearing flank of the thread serve quite well in increasing the breakaway torque of a collar swaged over the threads by receiving swaged material and providing a collar-to-pin interference lock. When used with a threaded collar, however, the impressions have no effect on the frictional resistance between the female and male threads, and as a consequence the impressions do not affect preload.

These and other features, aspects and advantages of the present invention will become more apparent from the following description, appended claims and drawings.

DESCRIPTION OF THE PREFERRED EMBODIMENT

Figure 1:
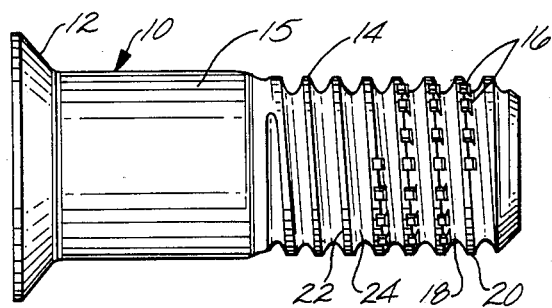
FIG. 1 shows a preferred form of the pin of the present invention in side elevation.
Figure 2:
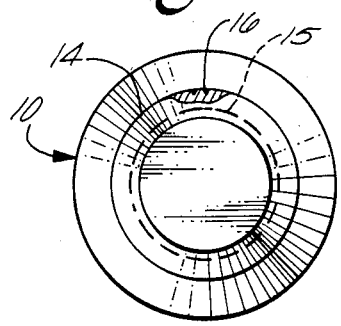
FIG. 2 shows the pin of FIG. 1 in end view with a section of the thread slightly broken away to show the penetration depth of the impressions in the thread.

FIGS. 1 and 2 show a preferred male fastener or pin 10 of the present invention. The pin has a preformed head 12 at one end, a roll-formed thread 14 at the other end, and a smooth shank 15 between the head and thread. The thread has a plurality of recesses or impressions 1 in it. The thread has a thread root 18 and a thread crest 20. Thread 14 has a load-bearing side 22 and nonload-bearing side 24, the load-bearing side faces the work and the nonload-bearing side faces away from the work. The impressions extend only from the crest of the threads radially inward to a depth spaced above the thread root on the nonload-bearing side or flank of the thread, as seen best in FIG. 3.

Preferably, the impressions in the thread have a depth of about 0.1 to about 0.3 of the root-to-crest height of the thread. The whole length of the thread does not have impressions: the thread length next adjacent to the shank 15 and the free end of the pin do not have impressions. The reason for this is that the impressions are not necessary in these areas and die design is facilitated. But if desired, the impressions can be added along the whole length of the thread and die design can accommodate this.

The number of impressions and their spacing along the thread determines the amount of collar material the impressions receive from a swaged collar. Consequently, the number of impressions determine the strength of the interference locks between the collar and the pin. It does not take many impressions nor a large total volume of impressions to make an effective interference lock. Further, the depth of the impressions need not be great to effect a good interference lock, and therefore the strength of the thread in tension is not affected by the impressions. It is preferred that the impressions open at the thread crests because that is the closest point to the collar and swaged collar material is bound to fill the impressions, and because it is easy to make the impressions there. The shape of the impressions is also not important; for example, they can be wedge shaped, converging to an edge at their inner radial ends, and they can be rectangular parallelipiped, as shown in FIG. 3.

Figure 3:
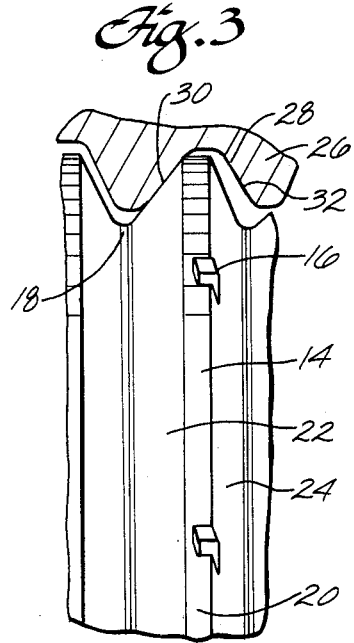
FIG. 3 shows the cooperation of the thread of the pin with that of a cooperating nut in a partial side elevational view partly in half section.

The impressions do not affect the coaction of a male thread with a cooperating female collar thread, as seen in FIG. 3. A collar 26 has a female thread 28, which also has a load-bearing flank 30 and a nonload-bearing flank 32. The collar threaded onto the pin bears against the workpiece so that the load-bearing flanks of the collar thread and the pin thread engage with the collar loading the pin in tension through that engagement. Because impressions 16 do not extend through the thread onto the load-bearing flank of the thread, the frictional resistance between the load-bearing flanks of the collar and the pin does not increase at all because of the impressions.

Figure 4:
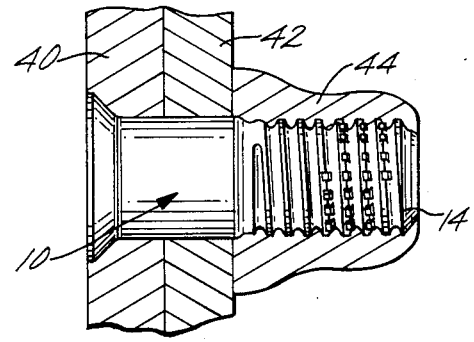
FIG. 4 shows the pin of FIG. 1 in receipt of a swaged collar and clamping a workpiece between the head of the pin and the collar in a side elevational view partly in half section.
Figure 5:
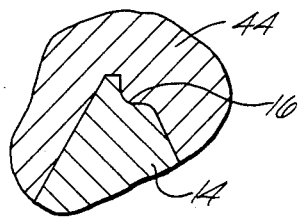
FIG. 5 shows a collar swaged into an impression in the thread of the pin of FIG. 1 in a fragmentary sectional view.

FIGS. 4 and 5 show the pin used with a swaged collar. In FIG. 4, pin 10 has been set in a pair of workpieces 40 and 42. A collar 44 has been swaged over thread 14 in a standard manner. Material of the collar has entered impressions 16, as shown in FIG. 5, and an interference lock between collar and thread formed.

The impressions depth is preferably from about 0.1 to about 0.3 of the height of the thread from the major diameter to the thread root diameter. This range satisfactorily develops the lock between the swaged collar and the threads, and a greater depth is not usually necessary.

It is also not necessary to have the impressions extend the entire length of the thread. This means that die design need not take into account the impressions in the difficult areas of the die that forms the interior end of the thread and the free end of the thread. It has been found that a length of the pin thread corresponding to 1.5 pitch lengths at the free end and adjacent the shank is adequate for good die design.

In one series of tests a collar swaged onto a 3/16 inch threaded pin with the impressions compared to a swaged collar on the same sized threaded pin without impressions increased the breakaway torque from a range of 16 to 24 inch pounds to a range of about 32 to 48 inch pounds.

The present invention has been described with reference to a preferred embodiment. The spirit and scope of the appended claims should not, however, necessarily be limited to the foregoing description.

I claim:

1. In a male fastener used with a cooperating threaded female fastener or a swaged collar, the male fastener having a thread extending from one end of the fastener to an interior end of the thread, the thread having root, a major diameter, a load bearing flank, a nonload-bearing flank, and no projections on either flank, an improvement comprising;

a plurality of spaced apart impressions only on the thread major diameter and on the nonload-bearing flank, the nonload-bearing flank being smooth and continuous except for the impressions, the load-bearing flank being smooth and continuous and free of the impressions, whereby, when used with a swaged collar, collar material enters the impressions to lock the collar and the male fastener together, but when used with a threaded female fastener the impressions do not increase the friction between the male and female fasteners during installation.

2. The improvement claimed in claim 1 wherein the impressions are from about 0.1 to about 0.3 times the height of the thread measured from the thread root to the thread major diameter.

3. The improvement claimed in claim 1 wherein the impressions are spaced axially at least 1.5 thread convolutions from the interior end of the thread.

4. The improvement claimed in claim 3 where the impressions are from about 0.1 to about 0.3 times the height of the thread measured from the thread root to the thread major diameter.

* * * * *